Figure 4:
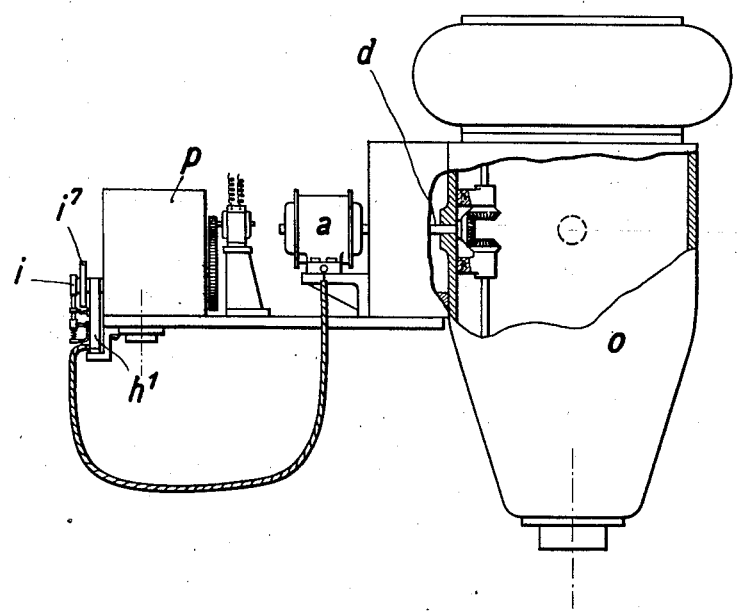

Sept. 10, 1935.  F. PFEIFFER ET AL  2,014,188
APPARATUS FOR TAKING SERIES OF PHOTOGRAPHS
Filed Aug. 5, 1932   2 Sheets-Sheet 1
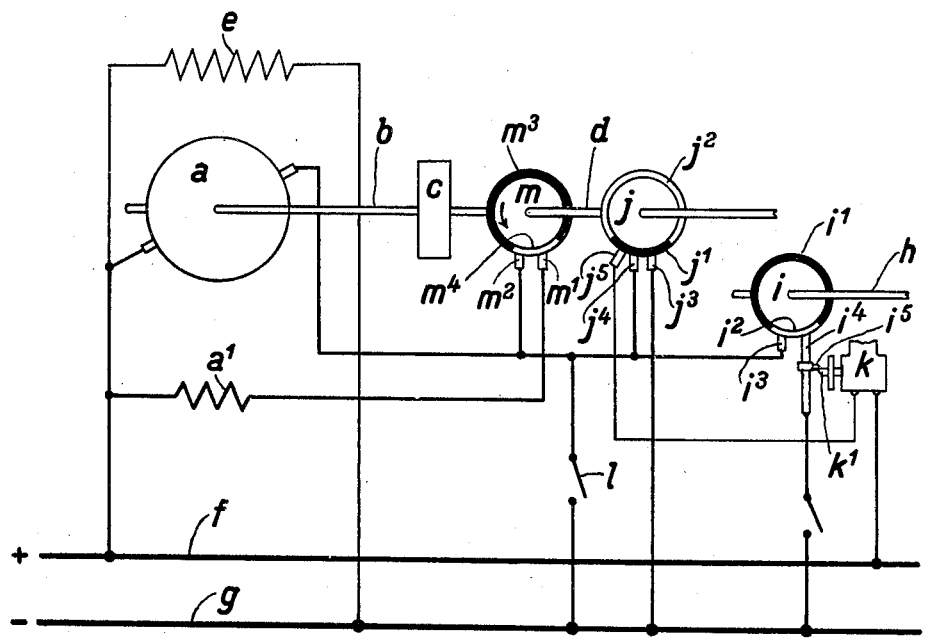
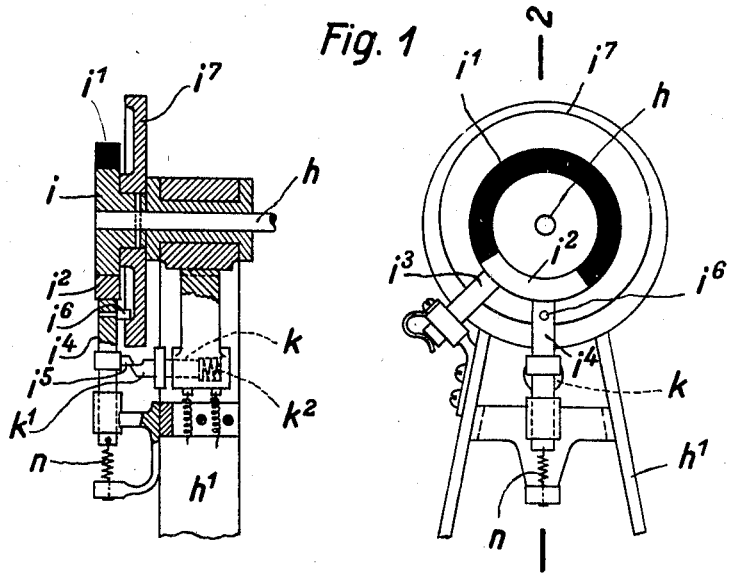
Fig. 1
Fig. 2
Fig. 3
Inventors:
Franklin Pfeiffer.
Karl August Traenkle Sept. 10, 1935. F. PFEIFFER ET AL 2,014,188
APPARATUS FOR TAKING SERIES OF PHOTOGRAPHS
Filed Aug. 5, 1932 2 Sheets-Sheet 2

Inventors:
Franklin Pfeiffer.
Karl August Traenkle

Patented Sept. 10, 1935

2,014,188

UNITED STATES PATENT OFFICE 2,014,188

APPARATUS FOR TAKING SERIES OF PHOTOGRAPHS

Franklin Pfeiffer and Karl August Traenkle, Jena, Germany, assignors to the firm of Carl Zeiss, Jena, Germany Application August 5, 1932, Serial No. 627,616
In Germany August 13, 1931

5 Claims. (Cl. 88—16)

We have filed an application in Germany, August 13, 1931.

When so photographing from an aircraft a landscape by means of an automatic camera that two each of the adjacent pictures join in the desired manner and, for instance, overlap to a certain extent, additional use is made of an overlap controller, that is to say of a finder with travelling marks moving through the field of view of this finder in a direction contrary to the course of the aircraft. If these travelling marks are controlled in such a manner that they move with an angular speed equal to that with which the different points of the landscape pass through the field of view, a conclusion as to the time between two periods of exposures that is required for obtaining the desired overlap may be drawn from the speed which the marks are to be given. Starting the camera driving device at the requisite times may be effected by hand or automatically by means of the overlap controller. It has been suggested, for instance, to connect to this controller a contact device and to make this contact device start the camera driving device electromagnetically. The contact device of the overlap controller may, however, not stop the camera driving device after an exposure has been made and the film transport effected, since to the travelling marks of the controller are to be imparted different speeds (which depend for instance upon the height of flight and the flying speed) while the driving device of the camera is to be driven with one and the same speed. With the apparatus suggested so far, the stopping of the camera driving device has been effected mechanically by means of a spring catch so coacting with a stop that, after one rotation of a certain shaft of the camera driving device, the spring catch is released from the teeth of a coupling part that interconnects the camera driving device and the motor and with which the catch engages during the film transport.

According to the invention an electromotor is provided for driving the camera driving device, this device being rigidly coupled to the electromotor and to a rotating electric contact which closes the circuit of this motor and which opens the circuit subsequently to each period of exposures. In this manner there is obtained a very simple driving device which has proved to be very convenient. Hitherto it has been considered necessary to drive the camera by a motor which runs with equal speed and is coupled to the camera by means of a detachable coupling. Tests have proved, however, that driving the camera by means of a motor rigidly coupled to the driving device is to be given the preference when this driving device is coupled to a contact device determining the time at which the camera driving device has to be stopped. However, this involves some difficulties at the outset in so far as owing to the inertia of the comparatively heavy and comparatively quickly running motor armature starting as well as stopping the camera driving device may not be effected instantaneously. Nevertheless, this difficulty may be overcome.

With a view to avoiding this drawback, it is convenient to connect in parallel to the motor armature a resistance which destroys the energy in the motor armature as soon as the motor slows down, thus causing a braking effect and a rapid stop of the armature.

In order to avoid any unnecessary loss of energy, the brake resistance is not connected until the motor is to be stopped. For this purpose it is advisable to couple to the camera driving device a rotating contact disc connecting and disconnecting the brake resistance.

In the case of long time intervals between two periods of exposures, that is to say when the contact of the overlap controller rotates only very slowly, it may happen that an exposure is already effected and the motor disconnecting contact of the camera driving device has made more than one rotation before the contact of the overlap controller opens. This would mean a premature new exposure. In this way two or even more exposures could be made instead of one. With a view to prevent this inconvenience, the current supply to the contact of the overlap controller is effected by means of a detachable brush, this brush being raised by an electromagnet as soon as the circuit of the motor is closed by the contact connected to the camera driving shaft.

The object of the invention is explained in detail in the following, in which reference is had to the accompanying drawings. In the drawings, Figure 1 represents the electric system of an apparatus according to the invention, Figures 2 and 3 illustrate a detail of the constructional example in cross section and elevation, respectively, and Figure 4 shows in part-sectional elevation the constructional connection of the automatic camera and the overlap controller.

In the drawings, $a$ is the armature of a direct current motor the axle $b$ of which is rigidly connected to the axle $d$ of the driving gear of an automatic camera $o$ by means of a gear $c$ that translates the number of revolutions of the motor to slow speed. The motor, whose field winding is denominated $e$, is fed by wires $f$ and $g$. $h$ is the axle of an overlap regulator. To this axle is fixed a contact disc $i$ the circumference of which is provided with an insulating annular piece $i^1$ and a conducting annular piece $i^2$. Two contact brushes $i^3$ and $i^4$ slide on the disc $i$, these two brushes being connected to one brush of the motor armature $a$ and to the wire $g$, respectively. The disc $i$ supplies current for starting the motor in each period of exposures. Opening of the motor circuit after an exposure is effected by means of a contact disc $j$ fixed to the driving gear axle $d$ of the camera. The circumference of the disc $j$ is provided with an insulating annular piece $j^1$ and a conducting annular piece $j^2$. On these two annular pieces slide the contact brushes $j^3$, $j^4$ and $j^5$, the brushes $j^3$ and $j^4$ being connected in parallel to the brushes $i^3$ and $i^4$. The brush $j^5$ is connected to one end of the coil of a pot-shaped magnet $k$. The other end of this coil is connected to the wire $f$. Parallel to the brushes $i^3$ and $i^4$ is connected a hand switch $l$. There is also provided a resistance $a^1$ one end of which is rigidly connected to one terminal of the motor armature $a$ and whose other end is connected to a brush $m^1$ of the contact disc $m$ fixed to the camera driving axle $d$. Another brush $m^2$ of this disc is connected to the other terminal of the motor armature $a$. The disc $m$ is provided with an insulating annular piece $m^3$ and a conducting annular piece $m^4$.

The brush $i^4$ is influenced by a spring $n$ (Figures 2 and 3) which tends to draw the brush away from the disc $i$. An ear $i^5$ which is disposed on the brush $i^4$ and lies against a stop $k^1$ displaceable at right angles to the moving direction of the brush, prevents the brush from giving way to the tension of the spring $n$ (Figure 2). The stop $k^1$ represents the armature of the magnet $k$ which is fixed to the support $h^1$ of the shaft $h$. A spring $k^2$ continuously presses the stop $k^1$ into the stop position. On the brush $i^4$ is provided a pin $i^6$ coacting with a cam disc $i^7$ fixed to the nave of the contact disc $i$.

The apparatus works as follows: The axis $h$ of the overlap controller $p$ rotates continuously at a speed conforming to the speed and the altitude, etc., of the aircraft. As soon as the disc $i$ assumes a position (approximately the one represented in the drawings) in which the two brushes $i^3$ and $i^4$ lie against the conducting annular piece $i^2$, the contact of the overlap controller supplies current to the armature $a$, and the motor is started. The armature and, consequently, the driving gear axle $d$ of the camera are thus caused to rotate, the axle $d$ rotating with a speed superior to that of the shaft $h$. Soon after the starting of the motor, the brushes $j^3$ and $j^4$ touch the contact piece $j^2$ and the contact on the camera shaft closes the circuit of the armature, so that current may be supplied to the armature by the source of power. As soon as the brushes $i^3$ and $i^4$ are in contact with the insulating piece $i^1$, the contact $j^2$ alone takes charge of the current supply to the motor armature. When the brushes $j^3$ and $j^4$ leave the contact piece $j^2$ the motor is disconnected, since the brushes $i^3$ and $i^4$ still slide on the insulating piece $i^1$. Before the brushes $j^3$ and $j^4$ come into contact with the insulating piece $j^1$, the brushes $m^1$ and $m^2$ have arrived at the conducting piece $m^4$ and thus effected the actuation of the braking resistance $a^1$, which causes the armature $a$ to discontinue its rotation comparatively quickly. The braking resistance is so adjusted that the brush $m^2$ is made to touch the insulating piece $m^3$ and that the motor armature $a$ is stopped before the two brushes $j^3$ and $j^4$ have reached the contact piece $j^2$. With a view to preventing the contact disc $i$ from causing another start of the motor before the brushes $i^3$ and $i^4$ have left the contact piece $i^2$, the brush $i^4$ is raised from the contact disc $i$ as soon as the two brushes $j^3$ and $j^5$ have come into touch with the contact piece $j^2$. When this is the case, current flows from the wire $f$ through the magnet $k$ and by way of the brushes $j^5$ and $j^3$ to the wire $g$. The magnet $k$ attracts the stop $k^1$, and the spring $n$ causes the brush $i^4$ to move downwards. Immediately before the disc $i$ reassumes the position represented in the drawings the cam disc $i^7$ again presses the brush $i^4$ against the disc $i$, and the described process is repeated.

We claim:

1. An apparatus for taking series of photographs overlapping each other, comprising an automatic camera, an overlap controller, a shaft connected to the driving gear of the camera, another shaft connected to the overlap controller, an electromotor having an armature fixedly coupled to the first said shaft, a source of power for supplying current to the motor armature, a contact controlled by the shaft connected to the overlap controller, this contact being connected in series to the motor armature and the source of power and being adapted to close the circuit of the armature during each period of exposure, and another contact coupled to the shaft driving the gear of the camera, this other contact being in series also with the motor armature and the said source of power, each of the said contacts having a revolving member closing the circuit of the said motor armature for a certain time in each period of exposure, and the rotating members of the two contacts having such a relation to each other than at the beginning of each period of exposure only the rotating member of the first said contact closes the circuit of the motor armature and that after a certain rotation of the motor armature the two rotating members keep this circuit closed and that finally only the rotating member of the said other contact keeps the circuit of the armature closed and opens this circuit.

2. An apparatus for taking series of photographs overlapping each other, comprising an automatic camera, an overlap controller, a shaft connected to the driving gear of the camera, another shaft connected to the overlap controller, an electromotor having an armature fixedly coupled to the first said shaft, a source of power for supplying current to the motor armature, a contact controlled by the shaft connected to the overlap controller, this contact being connected in series to the motor armature and the source of power and being adapted to close the circuit of the armature during each period of exposure, and another contact coupled to the shaft driving the gear of the camera, this other contact being in series also with the motor armature and the said source of power, each of the said two contacts consisting of an electrically conductive rotating segment and at least one contact finger which temporarily touches the rotating segment, the segments of the two contacts having such a relation to each other that at the beginning of each period of exposure only the contact finger of the first said contact touches the appertaining segment and thus closes the circuit of the motor armature and that after a certain rotation of the motor armature the contact fingers of the two contacts touch the appertaining segments and thus keep the said circuit closed and that after a further rotation only the contact finger of the said other contact touches the appertaining segment and opens the said circuit.

3. In an apparatus according to claim 1, a braking resistance and means connecting this resisance in parallel to the motor armature at the moment when the circuit of this armature is opened.

4. In an apparatus according to claim 2, a braking resistance, and a third rotating contact disposed on the first said shaft, this third contact being connected in series with the braking resistance and adapted to connect this resistance in parallel to the motor armature when the circuit of this armature is opened.

5. In an apparatus according to claim 2, the first said contact being provided with a detachable brush, means for raising this brush, an electromagnet controlling these means, and means for opening the circuit of this electromagnet.

FRANKLIN PFEIFFER.
KARL AUGUST TRAENKLE.